United States Patent [19]
Kunig

[11] Patent Number: 5,823,866
[45] Date of Patent: Oct. 20, 1998

[54] PRESSING BELT FOR SEPARATORS

[75] Inventor: Helmut Kunig, Bad Schwartau, Germany

[73] Assignee: Nordischer Maschinenbau Rud. Baader GmbH & Co KG, Lubeck, Germany

[21] Appl. No.: 771,157

[22] Filed: Dec. 20, 1996

[30]       Foreign Application Priority Data

Dec. 27, 1995   [DE]   Germany .................. 295 20 564 U

[51] Int. Cl.⁶ ................................................. A22C 17/00
[52] U.S. Cl. ............................................................ 452/138
[58] Field of Search .............................................. 452/138

[56]                  References Cited

U.S. PATENT DOCUMENTS

| | | | |
|---|---|---|---|
| 3,829,931 | 8/1974 | Suerbaun ................................ | 452/138 |
| 4,156,384 | 5/1979 | Hinds, Jr. et al. ........................ | 99/459 |
| 4,899,890 | 2/1990 | Ewing et al. ............................ | 452/138 |
| 5,302,150 | 4/1994 | Walbeck et al. ......................... | 452/138 |
| 5,507,689 | 4/1996 | McFarland et al. ..................... | 452/138 |
| 5,674,117 | 10/1997 | Kunig et al. ............................. | 452/138 |

FOREIGN PATENT DOCUMENTS 21 33 954   4/1973   Germany .

*Primary Examiner*—Willis Little
*Attorney, Agent, or Firm*—Fay, Sharpe, Beall, Fagan, Minnich & McKee

[57]                   ABSTRACT

The invention concerns a pressing belt for separators which include a hollow drum having a perforated outer surface around which an endless flexible pressing belt is partially wrapped under pressure to form a pull-in or input zone with the drum. Separators of this kind serve to separate the flowable components from the less flowable components of material mixtures and are principally used in the food industry. In order to improve the wear and thus the durability of the belt, it is provided with a multi-layer structure with a high-tenacity intercalation and an upper layer, the material characteristics of the various layers being adaptable to the precise nature of the application and thereby allowing the durability to be optimised.

17 Claims, 1 Drawing Sheet

PRESSING BELT FOR SEPARATORS

BACKGROUND OF THE INVENTION

1. Field of the Invention

The invention concerns an endless flexible pressing belt for separators, i.e. separating or mincing apparatuses, which comprise a drum having a perforated outer surface around which the pressing belt is partially wrapped under pressure to form an input or feeding zone for introducing material to be separated between the perforated drum and the pressing belt, so that flowable components enter into said drum while less or non-flowable material is led away from the outer surface of the drum.

2. Prior Art

Separators of this kind serve, for example, to separate meat from bones, tendons, ligaments and skin or fishmeat from bones, i.e. generally for the separation of flowable and less flowable components of a material mixture, and are principally used in the food industry. The pressing belts used in these separators must remain intact and lose no particles through abrasion despite the high strain placed on them, and must also be hard-wearing for reasons of economy.

Due to their contact with foodstuffs, the choice of possible materials is limited to those which are physiologically harmless. In this respect, specially standardized polyurethane materials have the advantage over rubber materials in that they show a higher resistance to abrasion and a higher toughness, while the latter materials have the advantage of greater resilience.

The strain placed on the pressing belt and resulting from the use according to its applicability is concentrated mainly in particular areas of the belt. Thus the contact of the pressing belt with the perforated drum in connection with the flexing strain due to the pressing forces and the product related local deformation by hard particles cause the surface to become abraded and its structure strained. Likewise, the underside is subject to abrasion and structural strain due to a pressing roller, which generates the pressing force of the belt against the drum, and to the belt guide means such as deflection rollers and the like and support systems. The latter particularly affect the outer areas of the belt underside. Finally, the sliding of the belt past lateral limiting elements results in the abrasive straining of the belt edges.

All this leads in extreme cases, for example when processing meat containing bone pieces, to the belt having to be replaced after only two working shifts in order to prevent particles of the belt landing in the product. The efficiency of the separation process is therefore very unsatisfactory.

OBJECTS OF THE INVENTION

It is thus an object of the invention to overcome the deficiencies of prior art by suggesting a pressing belt for separators which can be fabricated in a relatively simple and low-cost manner. It is a further object of the present invention to suggest a pressing belt which demonstrates a considerably improved durability.

SUMMARY OF THE INVENTION

These and further objects of the invention are achieved in an endless flexible pressing belt for separators comprising a drum having a perforated outer surface around which the pressing belt is partially wrapped to apply pressure, so forming an input zone for introducing material to be separated between the perforated drum and the pressing belt in that said belt has a sandwiched or multi-layer structure including a lower layer, an intermediate layer with at least one high-tenacity intercalation and an upper layer. The advantages achievable with such a construction include essentially that the individual belt zones may be provided with material characteristics which are exactly suited to the individual local demands placed on them.

In a preferred embodiment of the invention, the pressing belt is better able to accomodate coarse particles without incurring damage to its structure and to guide these particles through the process when the intermediate layer has a shore A hardness which is less than or equal to that of the lower layer, and specifically has a shore A hardness of between 30 to 70 shore. This effect is still further improved when the shore A hardness through the belt thickness decreases progressively from the lower layer through to the intermediate layer.

Furthermore, when the same base materials are used for these layers, such as rubber for example, the connection in the boundary layer region between the lower and intermediate layers is unproblematic. Depending on the choice of material, this connection can take place by polymerisation, vulcanisation, adhesion, welding or burring. It should be noted that the two layers may be formed of the same base material but have different shore A hardness values in accordance with the invention.

By employing a polyurethane film with a shore A hardness of between 65 and 95 shore for the upper layer, the compression resilience of the belt, i.e. its ability to restore itself after large or coarse particles have been embedded in or penetrated into its surface, can be improved. This also improves the durability of the belt when it is employed for processing meat containing bones. In a particularly advantageous further embodiment of the invention, this polyurethane film can be formed as a separately guided endless belt lying loosely on the intermediate layer. This allows the band to be adapted to the individual requirements in an efficient and low-cost manner.

Such a covering layer can also advantageously be provided in the region of the edge areas of the lower layer. In this way, these layers can likewise be formed as loose endless belts and be made with inserts of a high tensile strength. When these covering layers are guided tightly tensioned together with the pressing belt in the region of contact between the belt and the drum they tend to form a planar support for the pressing belt which limits the bulging effect of the belt particularly in the input zone.

BRIEF DESCRIPTION OF THE DRAWINGS

Further objects of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE DRAWINGS

Figure 1:
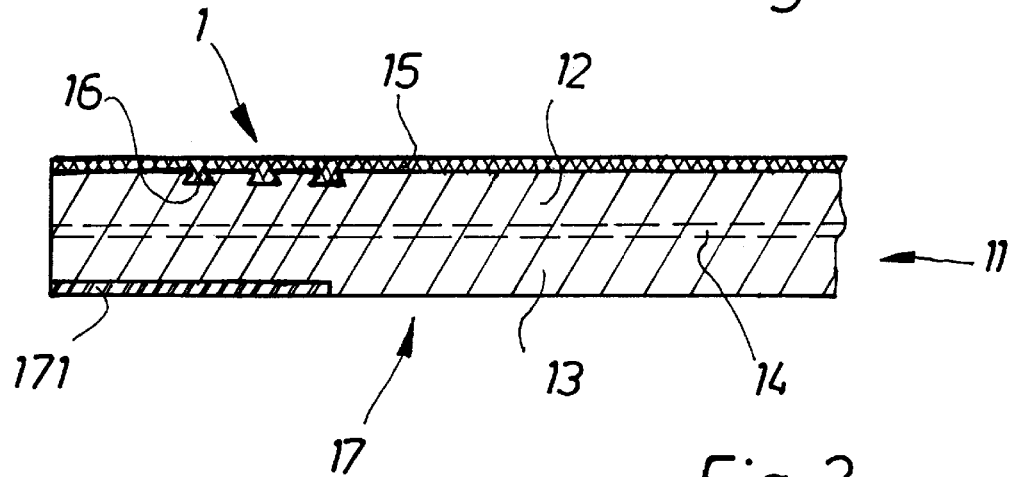
FIG. 1 shows a partial sectional view of a pressing belt.

FIG. 1 shows a pressing or squeezing belt 1 incorporating several material layers in accordance with the invention. The pressing belt 1 is pressed against a hollow drum 2 having a perforated outer surface 21. In accordance with the illustrated sectional representation, the pressing belt 1 comprises an intermediate layer or portion 11 which itself preferably comprises two layers, 12 and 13, arranged on either side of an intercalation 14. The intercalation may for example be formed of highly tenacious fibrous elements which are coiled in the longitudinal extension and form an endless layer of tension webs. These webs of the intercalation 14 may be produced by using polyamide, polyester and/or aramide fibres or fabrics or derivatives of these components. The expression "tenacious" a is used herein in the sense of demonstrating a high apparent yielding point or elasticity. Therefore, it is even possible that the intercalation is made from steel fibres or steel fabric. The connection or bond between the layers 12 and 13 and the fixing of the intercalation 14 is achieved according to the materials employed by polymerisation, vulcanisation, welding glueing or adhesion. According to FIG. 1 the working side of the intermediate portion 11 is provided with a special upper layer or coating 15. Depending on the application, the upper layer 15 is homogenously bonded to the intermediate portion 11. This is achieved by one of the above-mentioned methods according to the material choice, and the connection can be improved by providing the bonding surfaces with complementary profiles as indicated in FIG. 1 which results in the positive locking or linking of the two surfaces. In accordance with FIG. 3 the upper layer 15 is provided as a separate endless belt 151. This separate belt may lie loosely on the intermediate portion 11 and may be guided together with the latter, but it may as well be guided along the same path as the pressing belt 1 only in the latter's working area, i.e. merely in the contact area between belt 1 and drum 2, by suitably positioned deflection rollers 3, 4, 5.

Figure 3:
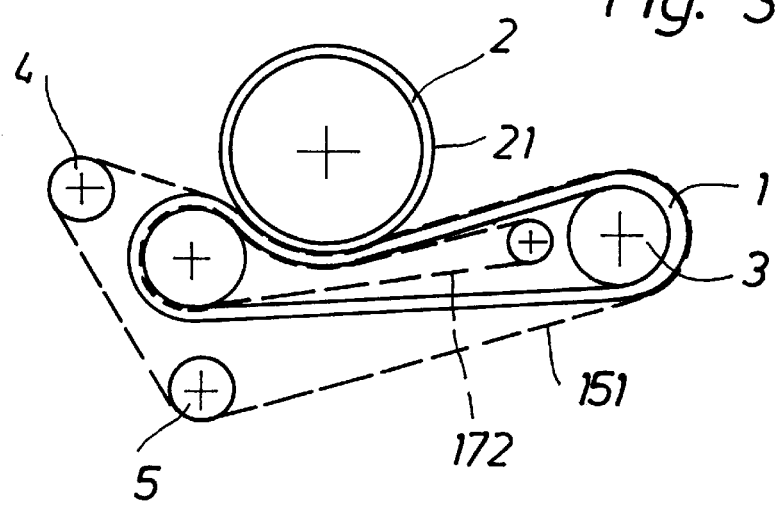
FIG. 3 shows a functional representation of the pressing belts of FIGS. 1 and 2

The pressing belt 1 comprises a lower layer or covering 17 which can either cover the whole of the intermediate portion surface or merely the edge portions of the pressing belt 1, i.e. be formed of two layer parts 171, as shown in FIG. 1. Depending on the application, the lower layer 17 or the layer parts 171 can be homogenously connected to the intermediate portion 11 in the manner already described or, as shown in FIG. 3, be formed as a separate endless belt 172, which is guided with the pressing belt 1 in the latter's working area, i.e. in the area of contact between belt 1 and drum 2.

Figure 2:
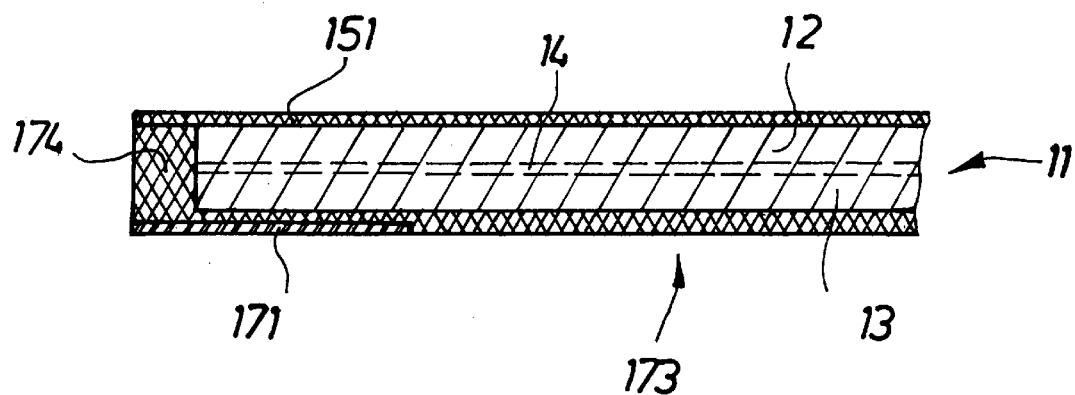
FIG. 2 shows a partial sectional view of a modified pressing belt.

According to FIG. 2, the lower layer is formed with a U-shaped cross-section 173, the intermediate portion being received between the legs 174 of the U-shaped profile such that its lateral edges are covered. In this way, the intercalation 14, which will generally be at least partially exposed at the edges of the belt when the latter is fabricated with an oversized width and subsequently cut down to size by division the longitudinal direction, is likewise laterally covered. The height of the legs 174 of the U-shaped profile corresponds to the thickness of the intermediate portion 11 so that the belt 151 formed by the upper layer 15 and the lower layer 173 together form a kind of housing in which the intermediate portion 11 is enclosed.

Optimal results with respect to durability and cost can be achieved by the pressing belt of FIGS. 1 and 2 which comprises an intermediate portion 1 of rubber with a shore A hardness of between 30 and 70 shore, and preferably between 60 and 70 shore, an upper layer 15 of polyurethane film with a shore A hardness of between 65 and 95 shore, and preferably between 75 and 90 shore, and a lower layer 17 of polyurethane film with a shore A hardness of between 65 and 95, preferably between 75 and 90 shore. In the case of certain forms of application advantageous working conditions may be achieved if the belt is structured such that the shore A hardness of the belt decreases progressively or continuously from the lower layer 17 towards the intermediate layer through to the same. For the lower layer 17 formed as a separate loosely guided belt 172 a polyurethane belt with an aramide fiber insert and a shore A hardness of about 80 has proved particularly satisfactory.

I claim:

1. An endless flexible pressing belt for a separator apparatus comprising a hollow drum having a perforated wall defining an outer surface, around which said pressing belt is partially wrapped under pressure to form an input zone of said apparatus for introducing material to be separated between said drum and said pressing belt, wherein in said belt has a multi-layer structure comprising:

lower layer means;

intermediate layer means provided with at least one highly tenacious intercalation; and upper layer means, wherein said upper layer means is a separate endless belt means associated with said intermediate layer means that is functionally independent from said intermediate layer means and that lies loosely on said intermediate layer means.

2. A pressing belt as claimed in claim 1, wherein said intermediate layer means is essentially composed of material having a lower shore A hardness than the material of said lower layer means.

3. A pressing belt as claimed in claim 2, wherein the material structure is selected such that the shore A hardness of said belt decreases progressively from said lower layer means through to said intermediate layer means.

4. A pressing belt as claimed in claim 1, wherein said intermediate layer means and said lower layer means are composed of a material having essentially the same characteristics.

5. A pressing belt as claimed in claim 4, wherein said material is rubber.

6. A pressing belt as claimed in claim 1, wherein said upper layer means comprises a polyurethane film having a shore A hardness of between 75 and 90 shore.

7. A pressing belt as claimed in claim 1, wherein said upper layer means is guided separately to cover the remainder of said belt lying below said upper layer means.

8. A pressing belt as claimed in claim 1, wherein said lower layer comprises at least at its edge areas thereof, respectively, a coating layer essentially composed of material having high tenacity and hard-wearing characteristics.

9. A pressing belt as claimed in claim 8, wherein at least in said edge areas of said lower layer means, said coating layer is essentially composed of a polyurethane film having a shore A hardness of between 75 and 90 shore.

10. A pressing belt as claimed in claim 8, wherein each said coating layer is formed as separately guided endless belt means.

11. A pressing belt as claimed in claim 10, wherein at least in said edge areas of said lower layer means, said endless coating layer belt means comprises an intercalation having high-tenacity characteristics.

12. A pressing belt as claimed in claim 10, wherein said endless coating layer belt means is guided together with the remainder of said pressing belt essentially only in said wrap area between said pressing belt and said drum.

13. A pressing belt as claimed in claim 11, wherein said endless coating layer belt means is guided together with the remainder of said pressing belt essentially only in said wrap area between said pressing belt and said drum.

14. A pressing belt as claimed in claim 1, wherein said lower layer means has a U-shaped cross-sectional profile adapted to receive said intermediate layer means including said intercalation, said upper layer means forming a covering layer for said U-shaped profile of said lower layer means.

15. A pressing belt as claimed in claim 1, wherein said intercalation comprises at least one of polyamide, polyester, aramide fibres, aramide fabric and a mixture of one of these materials.

16. A pressing belt as claimed in claim 1, wherein said intercalation comprises one of steel fibres and steel fabric.

17. A pressing belt as claimed in claim 1, wherein said belt layer means are connected to each other by one of polymerisation, vulcanisation, adhesion, welding, bonding, burring and by means of positively locking profiles.

\* \* \* \* \*